United States Patent
Borgers et al.

(10) Patent No.: US 8,950,247 B2
(45) Date of Patent: Feb. 10, 2015

(54) PRESSURE-MEASURING PLUG FOR A COMBUSTION ENGINE

(71) Applicants: Marc Borgers, Enschede (NL); Cris Ruiz Zwollo, Enschede (NL); Huub Toneman, Enschede (NL)

(72) Inventors: Marc Borgers, Enschede (NL); Cris Ruiz Zwollo, Enschede (NL); Huub Toneman, Enschede (NL)

(73) Assignee: Sensata Technologies, Inc., Attleboro, MA (US)

( * ) Notice: Subject to any disclaimer, the term of this patent is extended or adjusted under 35 U.S.C. 154(b) by 0 days.

(21) Appl. No.: 14/077,701

(22) Filed: Nov. 12, 2013

(65) Prior Publication Data
US 2014/0130585 A1    May 15, 2014

(30) Foreign Application Priority Data
Nov. 12, 2012 (EP) .................................. 12192308

(51) Int. Cl.
G01M 15/08 (2006.01)
F02D 35/02 (2006.01)
G01L 19/06 (2006.01)

(52) U.S. Cl.
CPC ............ G01M 15/08 (2013.01); F02D 35/023 (2013.01); G01L 19/0645 (2013.01)
USPC ..................................... 73/114.19; 73/114.18

(58) Field of Classification Search
USPC .............................. 73/114.18, 114.19, 114.21
See application file for complete search history.

(56) References Cited

U.S. PATENT DOCUMENTS

| | | | | |
|---|---|---|---|---|
| 5,425,371 A * | 6/1995 | Mischenko | ...................... | 73/705 |
| 6,204,594 B1 * | 3/2001 | Ingham | ......................... | 313/141 |
| 6,411,038 B2 * | 6/2002 | Murai et al. | ..................... | 315/55 |
| 6,539,787 B1 * | 4/2003 | Murai et al. | ............... | 73/114.21 |
| 7,114,396 B2 * | 10/2006 | Oda et al. | ......................... | 73/715 |
| 7,207,214 B1 * | 4/2007 | Wlodarczyk | .............. | 73/114.19 |
| 7,302,855 B2 * | 12/2007 | Oda | ................................. | 73/756 |
| 8,250,909 B2 * | 8/2012 | Kern et al. | ................. | 73/114.16 |
| 8,297,115 B2 * | 10/2012 | Borgers et al. | ............. | 73/114.19 |
| 8,429,956 B2 * | 4/2013 | Borgers et al. | ............. | 73/114.18 |
| 2001/0015402 A1 * | 8/2001 | Murai et al. | ................... | 248/554 |
| 2006/0090566 A1 * | 5/2006 | Oda | ................................. | 73/715 |
| 2006/0123887 A1 * | 6/2006 | Dordet | ........................ | 73/35.12 |
| 2009/0320576 A1 * | 12/2009 | Borgers et al. | ............. | 73/114.18 |
| 2012/0227477 A1 * | 9/2012 | Borgers et al. | ............. | 73/114.18 |
| 2014/0130585 A1 * | 5/2014 | Borgers et al. | ............. | 73/114.18 |
| 2014/0130586 A1 * | 5/2014 | Zwollo et al. | ............. | 73/114.21 |

* cited by examiner

*Primary Examiner* — Freddie Kirkland, III
(74) *Attorney, Agent, or Firm* — Chapin IP Law, LLC

(57) ABSTRACT

The invention relates to a pressure-measuring plug for a combustion engine comprising a plug body with a body tip section facing in use the combustion chamber and comprising a passage, a ring-shaped sensing structure comprising an outer section, an inner section and an annular diaphragm, the plug body being attached to the outer section, a circular membrane comprising an outer part coupled to the outer section and an inner part coupled to the inner section, the membrane provides a sealing protecting the annular diaphragm against the harsh environment in a combustion chamber; and, a plug chamber formed by the circular membrane and the body tip section wherein the passage of the body tip section provides an open connection between the plug chamber and the combustion chamber. The passage is part of a channel structure which functions as a soot filter.

20 Claims, 3 Drawing Sheets

PRESSURE-MEASURING PLUG FOR A COMBUSTION ENGINE

TECHNICAL FIELD

The invention relates to a pressure-measuring plug for a combustion engine with a plug body comprising an external thread for mounting the plug body into a cylinder head of the combustion engine. More particularly, the invention relates to a piezo-resistive pressure-measuring plug for a combustion engine.

BACKGROUND ART

A pressure-measuring plug for a combustion engine is known from EP2444786A1. The pressure-measuring plug comprises a plug body, a ring shaped sensing structure and a circular membrane. The plug body comprises an external thread section for mounting the plug body into a cylinder head of the combustion engine and a body tip section facing in use the combustion chamber. The ring-shaped sensing structure comprises an outer section, an inner section and an annular diaphragm. The plug body is attached to the outer section. The ring-shaped sensing structure allows the inner section to move relatively to the outer section along a cylinder axis of the ring-shaped sensing structure by deformation of the diaphragm. Strain gauges attached to the sensing structure sense the deformation of the sensing structure. The deformation has a relationship with the pressure acting on the pressure-measuring plug.

The circular membrane comprises an outer part coupled to the outer section and an inner part coupled to the inner section. The membrane provides a sealing protecting the annular diaphragm against the harsh environment in a combustion chamber.

The circular membrane and the body tip section form a chamber. A passage of the body tip section provides an open connection between the plug chamber and the combustion chamber. In this way, the pressure in the combustion chamber could act on the circular membrane and the inner section of the ring-shaped sensing structure.

In the future, advanced combustion strategies for diesel and Otto engines depend on the existence of accurate pressure feedback from each combustion cylinder during the entire engine cycle (compression—combustion—exhaust cycle). These strategies may or may not include Homogeneous Charge Compression Ignition (HCCI) combustion, and can result in high pressure release rates which require fast and accurate pressure response.

Accuracy of the sensor signal over the life time of the sensor is vital for correct closed loop combustion strategies. Drift in the sensor signal is known to occur by soot accumulation on the circular membrane. Accumulated soot reduces sensitivity to pressure changes and consequently to a loss of signal. A layer of soot changes the mechanical characteristics of the circular membrane and reduces the force transfer via the inner section to the diaphragm of the sensing structure where the force measuring elements in the form of strain gauges, are located. Soot can permanently change the sensor characteristics and is therefore an important durability and stability factor for the control of the engine.

During the combustion process, soot which could be any of elemental carbon, unburned fuel, sulfates etc., has been observed to condense/deposit on various engine components including the pressure-measuring plug interface directly exposed to combustion gasses. Soot is transported by the combustion gasses during and after the combustion process. Every surface or device in contact with combustion gasses is potentially affected by soot accumulation and, depending on its function, the device function can change over the life time of the engine when accumulation of soot is changing its characteristics.

Due to the nature of the pressure-measuring sensor in contact with the cooled engine head which creates a large temperature delta between hot combustion gasses and "cold" pressure-measuring sensor, combustion condensates collect on sensor surfaces (thermophoretic/diffusion-phoretic mechanisms) which also can adversely affect the sensor performance over time.

SUMMARY OF INVENTION

It is an object of the present invention to provide a cylinder pressure sensor that is less sensitive to soot exposure over the life time of the sensor.

According to a first aspect of the invention, this object is achieved by a pressure-measuring plug having the features of claim 1. Advantageous embodiments and further ways of carrying out the invention may be attained by the measures mentioned in the dependent claims.

A pressure-measuring plug according to the invention is characterized in that the pressure-measuring plug further comprises a channel structure forming the open connection between combustion chamber and the plug chamber. The channel structure is configured to guide in use a gas flow from the combustion chamber to the plug chamber along a path. The path comprises a bend preventing direct line of sight between the combustion chamber and parts of the diaphragm positioned between the inner section and the outer section. The path forces soot particles by their mass inertia to leave the gas flow and to hit at least one of a surface of body tip section and the inner section.

The invention is based on the insight that during a combustion engine cycle a gas flows into and out the plug chamber due to cyclic pressure variations due to the reciprocating movement of the combustion engine's piston and combustion of the gas in the combustion chamber. When the gas mixture in the combustion chamber is compressed and ignites, the gas flows through the passage of the body tip section to the plug chamber. When the pressure in the combustion chamber decreases, a gas flow is present in the open connection from the plug chamber to the combustion chamber. Soot is transported by the combustion gas flow. However, soot are relative large and heavy particles in the combustion gas. It is known, that particles can be removed from an air flow by changing the direction of the flow. The relative large and heavy particles could not follow the change in direction due to their mass inertia and will leave the air flow. By applying this principle in the passage to the circular membrane, the soot particles could not reach the membrane. However, the particles hit other surfaces of the device and will accumulate there. As the air flow of combustion gasses is hot, the air flow will heat the surfaces of the passage and the accumulated soot on said surface will burn up to smaller particles that are blown out of the pressure sensor during a decrease of pressure in the combustion cylinder. In this way it is possible to create a simple mechanical particle filter in the pressure sensor. By providing a passage structure which force the gas flow from the combustion engine to the chamber in the pressure sensor to make a turn, the soot is deposited on a heat surface on which the particles burn up to smaller particles.

In other words, the invention provides a soot particle filter for cylinder pressure sensors. The basic idea is to prevent direct-line-of sight between the combustion chamber and the bending parts of the membrane, i.e. the part of the membrane positioned between the inner section and the outer section of the sensing structure.

In an embodiment, the circular membrane covers a distal end of the inner section. This feature improves the sealing characteristics of the membrane. No perfect circular weld is needed to attach the circular membrane to the inner section of the sensing structure.

In an embodiment, the body tip section comprises at least one channel part with a channel axis which is at an angle with respect to the cylinder axis. These features provide a Z-shaped path for the flow of gas from the combustion chamber to the plug chamber. Before the gas flow enters the passage the flow makes a turn. At least some of the soot particles will leave the gas flow and hit the outer surface of the body tip section. In a specific embodiment, the channel axis of at the least one channel part is perpendicular to the cylinder axis. The sharper the curve, the more particles will leave the stream and hit a hot surface of the plug body.

In an alternative embodiment, the body tip section comprises a central passage. A first part of the central passage which connects to the plug chamber has a conical shape. In this embodiment, the soot particles will hit the distal end of the inner section of the sensing structure. These features provide a soot particle filter with a very effective structure which is simple and easy to manufacture. The conical shape allow the passage to discharge burned soot particles from the plug chamber.

In a further embodiment, the central passage further comprise a middle part and a second part, the second part connects in use to the combustion chamber, the middle part having a first diameter and the second part having a second diameter, wherein the second diameter is larger than the first diameter. These features improves the filter characteristics of the passage structure. Soot particles entering the second part will at least partially deposit at the surface next to the opening to the middle part. The flow through the middle part will accelerate the remaining soot particles such that due to their mass inertia hey will hit the inner section of the sensing structure.

In an alternative embodiment, the body tip section is configured to provide the channel structure wherein the gas flow passes subsequently a first passage and a second passage. The first passage and the second passage have a first passage axis and a second passage axis, respectively and the first passage axis is parallel to the second passage axis. A cross section of the first passage and the second passage do not overlap. In this way, the path of the air flow through body tip section comprises some bends providing a soot particle filter. In a further embodiment, the channel structure is formed by two parallel plate-like structures with passages, wherein the plate-like structures have a predefined mutual distance. These features provide as structure that could be assembled out off easy to manufacture parts.

In an embodiment, the body tip section is a sealing body part. This feature minimizes the outer surface of the plug body that is in contact with the combustion gasses. This enables to reduce the operating temperature of the sensing structure.

In an alternative embodiment, the inner section protrudes through the passage of the body tip section. The pressure-measuring plug further comprises a disc shaped body attached to the inner section. The disc shaped body is at a predetermined distance from the outer surface of the body tip section. These features provide a structure which reduces the possibility that soot particles reach the plug chamber.

In a further embodiment, the outer surface of the body tip section comprises a raised edge and a surface of the disc shaped body facing the sealing body part comprises another raised edge resulting in a gooseneck-type passage. These features improves the filtering characteristics of the passage as soot particles hit the hot surface of the passage and will be burned up which reduces the accumulation of soot particles.

In a further embodiment, the disc shaped body is attached to a distal end of the inner section. This feature provides a simple structure to ensure the minimal distance between disc shaped body and body tip section.

In an embodiment, surfaces of the plug chamber 107 and/or channel structure are covered with a platinum coating of >50 nm thickness. The platinum coating is a catalyst to oxidize unburned fuel condensates, long chain hydrocarbons, elemental carbon, etc. This reduces soot accumulation in the pressure-measuring plug.

Other features and advantages will become apparent from the following detailed description, taken in conjunction with the accompanying drawings which illustrate, by way of example, various features of embodiments.

BRIEF DESCRIPTION OF THE DRAWINGS

These and other aspects, properties and advantages will be explained hereinafter based on the following description with reference to the drawings, wherein like reference numerals denote like or comparable parts, and in which.

DESCRIPTION OF EMBODIMENTS

Figures 1, 2:
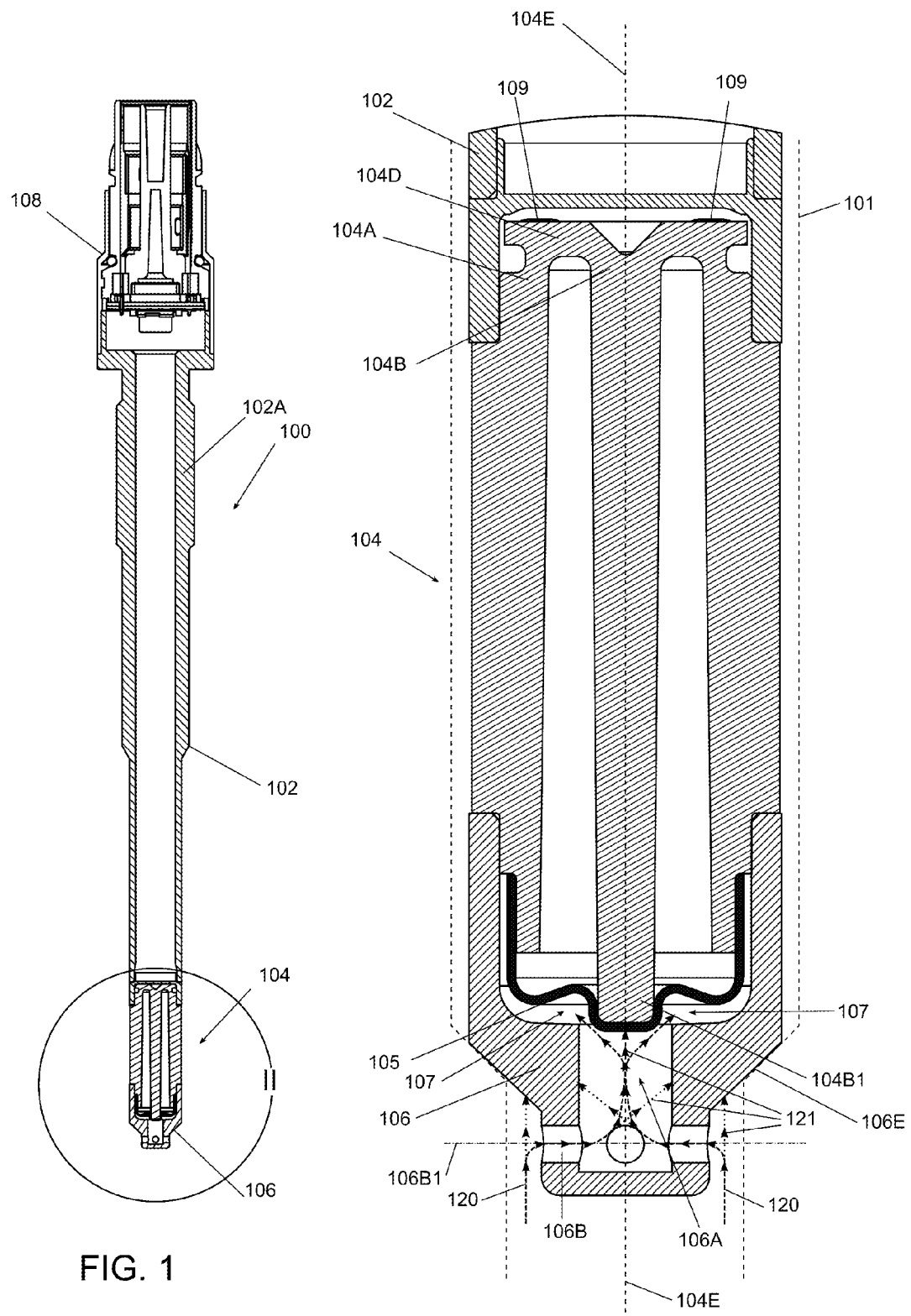
FIG. 1 shows schematically a sectional view of a first embodiment of a pressure-measuring plug.
FIG. 2 shows schematically details of the sectional view of the first embodiment shown in FIG. 1.

FIG. 1 show schematically a sectional view of a first embodiment of a pressure-measuring plug 100 for a combustion engine. The pressure-measuring plug 100 comprises a plug body 102 comprising an external thread section 102A for mounting the plug body 102 into a cylinder head of the combustion engine and a body tip section 106 facing in use the combustion chamber. A ring-shaped sensing structure 104 is positioned between the external thread section 102A and the body tip section 106 and forms also a part of the plug body. The pressure-measuring plug 100 further comprises a housing 108 which is provided with a hexagonal periphery to enable the mounting of the pressure-measuring device with a wrench. Sensor electronics (not shown) is provided in the space formed by the plug body 102 and the housing 108. Furthermore, a connector (not shown) is integrated in housing 108. FIG. 2 shows schematically details of the ring-shaped sensing structure 104 and the body tip section indicated by the circle with reference II.

The body tip section 106 is provided on the combustion chamber side with a cone-shaped sealing surface 106E, by means of which the pressure measuring plug seals off the combustion pressure at the cylinder head.

The ring-shaped sensing structure 104 comprises a tubular outer section 104A, a rod-shaped inner section 104B and an annular diaphragm 104D. The outer section 104A is attached to the plug body 102. The part are mechanically connected together through welding. The annular diaphragm 104D couples mechanically the inner section 104B to the outer section 104A. The ring-shaped sensing structure allows the inner section 104B to move relatively to the outer section 104A along a cylinder axis 104E of the ring-shaped sensing structure 104 by deformation of the diaphragm 104D. Sensing elements 109, which could be in the form of piezo-resistive elements, wire strain gauges or similar measuring elements suitable for measuring stress in a surface are attached to an annular surface of the diaphragm 104D. The annular surface is in a plane which is perpendicular to the cylinder axis 104E of the sensing structure 104. The sensing elements are configured to generate an electrical signal indicative for the amount of stress in the diaphragm. The sensor electronics will determine signal representative for the pressure acting on the tip pressure-measuring plug 100.

The pressure-measuring plug further comprises a circular membrane 105. An outer part or edge of the circular membrane 105 is coupled to the outer section 104A of the sensing structure 104. An inner part, i.e. a centre part of the membrane 105, is coupled to a distal end 104B1 of the inner section 104B. In the context of the present description the term coupled means that the parts coupled keep in use substantially the same distance with respect to each other and could be directly or indirectly via another structure attached to each other. The membrane 105 is preferably made from a metallic material and is connected mechanically to the respective parts of the sensing structure by means of a radial circumferential fillet weld or a radial circumferential through-weld. The connection can also be achieved by means of laser welding, crimping, swaging, soldering, press-fit etc. The membrane 105 provides a sealing protecting the annular diaphragm 104D against the harsh environment in a combustion chamber. Furthermore, the membrane protects the sensing elements 109 mounted on the sensing structure against the hot combustion gasses. The membrane 105 further reduces the radial movement of the distal end 104B1 of the inner section 104B. This improves the measuring characteristics of the pressure-measuring plug.

The space between the circular membrane 105 and the body tip section 106 forms a plug chamber 107. A passage of the body tip section 106 provides an open connection between the plug chamber 107 and the combustion chamber. In FIG. 2, dashed line 101 indicates the wall of the opening in the cylinder head of the combustion engine.

In the first embodiment, the body tip section 160 comprises a channel structure which forms the open connection between combustion chamber and the plug chamber 107. The channel structure comprises a central passage 106A. An end of the central passage joins the plug chamber 107. The central passage has an axis which coincides the cylinder axis 104E. The channel structure further comprises four channel parts 106B with an axis 106B1 which is perpendicular to the cylinder axis 104E. An end of the channel part 106B joins the central passage 106A. The opposite end of the channel part 106B form an opening in the outer surface of the body tip section 106.

The channel structure is configured to guide in use a gas flow from the combustion chamber to the plug chamber 107 along a path 120 that forces soot particles by their mass inertia to leave along a path 121 the gas flow and to hit at least one of a surface of body tip section 106 and the inner section 104B.

In use the pressure-measuring plug functions in the following way. When the pressure in the combustion engine increases, a gas flow through the channel structure occurs from the combustion chamber to the plug chamber. The dashed lines 120 indicate the path and direction of the gas flow. Soot particles are transported by the gas flow. However, due to the velocity of the gas flow and the mass inertia of the soot particles, the soot particles could not follow the path 120 of gas flow and leave the gas flow. Dotted lines 121 indicate paths of soot particles leaving the path 120 of the gas flow. Due to their mass inertia, particles hit the outer surface of the body tip section 106, hit the inner surface of the channel structure or the surface of the distal end 104B1 of the inner section 104B. In FIG. 2, the distal end of the inner section 104B is covered by the membrane 105.

Due to the gas flow through the channel structure, the body tip section 106 and distal end 104B1 of the inner section 104B will obtain a high temperature. As a result, the soot deposited on the surfaces of said part will burn up to smaller particles that are blown out of the pressure sensor during a decrease of pressure in the combustion cylinder. Furthermore, smaller soot particles accumulate less rapidly making the pressure-measuring plug less sensitive to soot accumulation.

Figure 3:
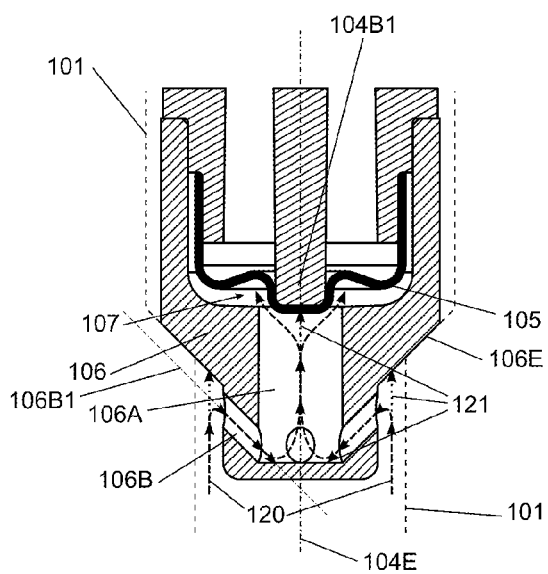
FIG. 3 shows schematically a second embodiment.
Figure 4:
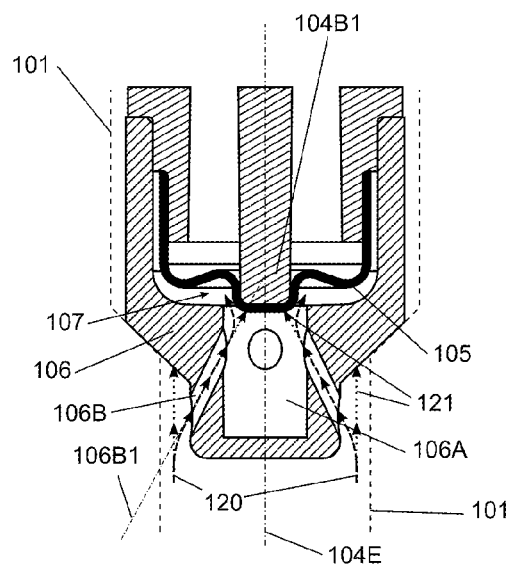
FIG. 4 shows schematically a third embodiment.

FIGS. 3 and 4 show a second and third embodiment, respectively. Dashed lines 101 indicates the wall of the opening in the cylinder head of the combustion engine. The second embodiment differs from the first embodiment in that the channel part 106B has a channel axis 106B1 with a negative angle with respect to the cylinder axis 104E. The negative angle makes transport of soot particles to the surface of the membrane more difficult due to the sharper curves in the path of the gas flow 120. Most soot particles hit the outer surface of the body tip section 106 and the inner surface of the centre passage 106A opposite the distal end 104B1 of the sensing structure 104. These parts of the body tip section will become hot and the soot particles that are deposited on the surface will burn up to smaller particles. The third embodiment in FIG. 4 differs from the first and second embodiment in that the channel part 106B has a channel axis 106B1 with a positive angle with respect to the cylinder axis 104E. The positive angle makes transport of soot particles through the channel part 106B more easy, but they obtain a higher mass inertia in the channel duct 106B. Subsequently, the soot particles could not follow the path 120 of the gas flow at the end of the channel part 106B and hit the surface of the non-bending part of membrane which covers the distal end 104B1 of the inner section 104B of the sensing structure 104. As this part does not bend at pressure variations this part is not sensitive to soot accumulation. Similar to the previous embodiment, these surface of the non-bending part is heated by the gas flow soot particles that are deposited on the surface will burn up to smaller particles.

In the first, second and third embodiment the number of channel parts 106B is four. It might be clear that at least one channel part 106B is needed to obtain the desired effect which prevents soot particles to reach the plug chamber 107 directly from the combustion chamber and to accumulate at the bending parts of the membrane 105. Preferably, the channel parts 106B are equally distributed along the ring-shaped wall of the body tip section 106.

Figure 5:
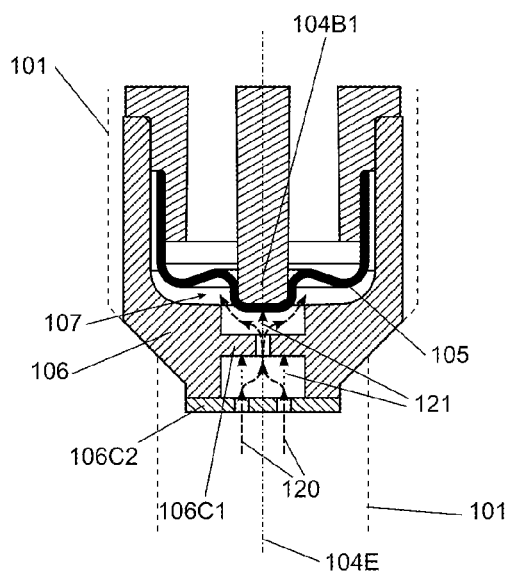
FIG. 5 shows schematically a fourth embodiment.

FIG. 5 shows a fourth embodiment. In this embodiment, the body tip section 106 is configured to provide the channel structure wherein the gas flow from the combustion chamber to the membrane 105 passes subsequently a first passage and a second passage. The channel structure is formed by two parallel plate-like structures 106C1, 106C2 with passages. The plate-like structures have a predefined mutual distance. A first passage is a passage in a plate-like structure 106C2 which forms the tip of the pressure-measuring plug. The second passage is the central passage in the plate-like structure 106C1 of the body tip section 106. The first passage and the second passage have a first passage axis and a second passage axis, respectively. The first passage axis and the second passage axis are arranged parallel to the cylinder axis 104E. Seen in the direction of the cylinder axis 104E, the cross section of the passages of the plate-like structure 106C2 and the cross section of the central passages of the plate-like structure 106C1 do not overlap. The predefined mutual distance between the plate-like structures 106C1, 106C2 is formed by a cavity in the body tip part 106. The cavity could be a bore-hole.

In this embodiment, the soot particles in the gas flow through the first passages leave the gas flow in the cavity between the two plate-like structure 106C1 and 106C2 by their mass inertia and hit the plate-like structure 106C1. The soot particles cannot follow the curve of the gas flow in the cavity to the central passage of the plate-like structure 106C1. As the plate-like structure 106C1 is hot due to the gas flow, the soot particles will burn up into small particles which accumulate less easy than larger soot particles. Soot particles that reach the central passage of the plate-like structure 106C2 have to make a subsequent bend to reach the bending parts of the membrane 105. It is likely that soot particles passing the central passage will hit the surface of the distal end 104B1 of the in section 104B. Dotted lines 121 indicate paths of soot particles leaving the path of gas flow 120. It should be noted that the number of passages of a plate-like structures 106C1, 106C2 is at least one and could have any configuration as long as the cross section of the passages seen in direction of the cylinder axis 104E do not overlap and the path 120 of the gas flow through the cavity between the two plate-like structures makes a bend which is sufficient for soot particles to leave the gas flow and to hit a surface of a wall of the cavity. In another embodiment plate-like structure 106C2 comprises one central passage and plate-like structure 106C1 comprises two or more passage equally distributed around the centre of the plate-like structure 106C1.

Figure 6:
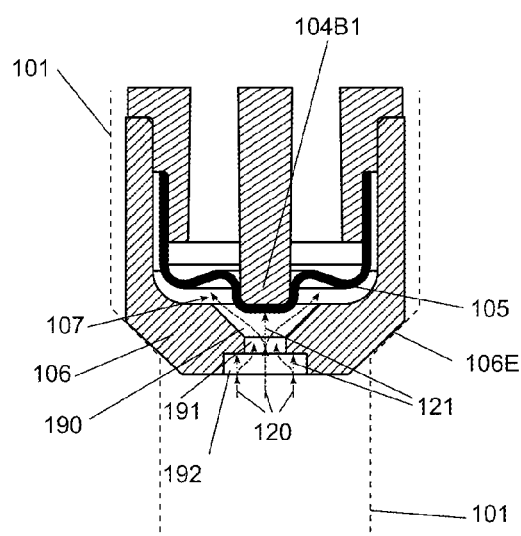
FIG. 6 shows schematically a fifth embodiment.

FIG. 6 shows a fifth embodiment. In this embodiment, the body tip section 106 comprises a central passage. The central passage comprises a first part 190, a middle part 191 and a third part 192. The first part 190 of the central passage connects at one end to the plug chamber 107. The other end connects to the second part. The diameter of the first part increase with the distance from the second part and forms a conical shape. This shape makes it more easy for soot particles to leave the plug chamber 107 when the pressure in the combustion chamber decreases. The middle part 191 has the smallest cross section of the passage through the body tip section 106. Soot particles will obtain in the middle part 191 the highest velocity. By their mass inertia they will leave the gas flow when it bends to the plug chamber 107 in the first part 190. The soot particles will proceed their way in substantially the direction of the cylinder axis 104E and hit the distal end 104B1 of the inner section of the sensing structure 104. The second part 192 connects in use to the combustion chamber. The second part 192 has a diameter which is greater than the diameter and the middle part 191. The cavity of the second part 192 assists that soot particles hit the outer surface of the body tip part 106 and burn up at the hot surface of the body tip section 106.

Figure 7:
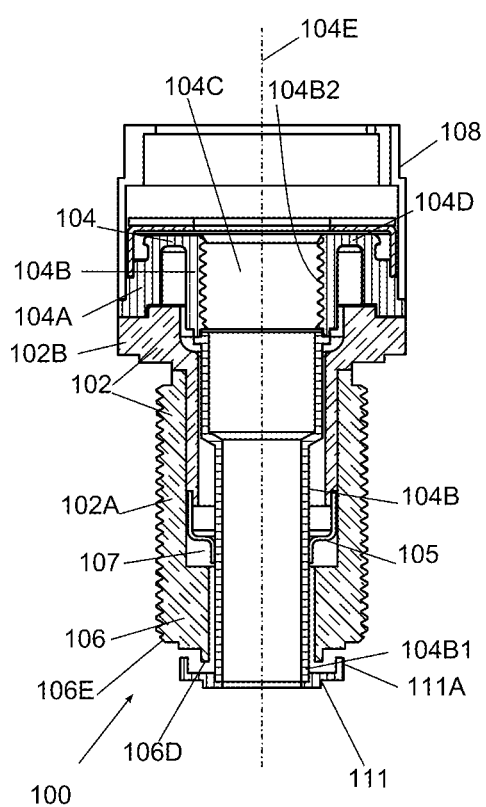
FIG. 7 shows schematically a sectional view of a sixth embodiment of a pressure-measuring plug.

FIG. 7 shows a sixth embodiment of a pressure-measuring plug. The pressure-measuring plug 100 comprises a plug body 102 and a ring-shaped sensing structure 104. The plug body 102 comprises a base part 102B, an external thread section 102A and a body tip section 106. The external thread section 102A is configured for mounting the plug body 102 into an opening in a cylinder head of a combustion engine. The body tip section 106 of the plug body 102 is provided on the combustion chamber side with a cone-shaped sealing surface 106E, by means of which the pressure measuring plug seals off the combustion pressure at the cylinder head.

The ring-shaped sensing structure 104 comprises an outer section 104A, an inner section 104B and a diaphragm 104D. The diaphragm 104D connects movably the inner section 104B to the outer section 104A. The outer section 104A is attached to a proximal end of the plug body 102. In this embodiment, the proximal end is part of the base part 102B. Via the threaded plug body 102 the outer section 104A could rigidly be mounted in a hole of an engine head. The inner section 104B comprising a through hole 104C for receiving a rod-shaped element 106. The through hole 104C of the ring-shaped sensing structure 104 has a cylinder axis 104E which is aligned with a cylinder axis of the threaded body part 102. The inner section 104B comprises an internal thread 104B2 for placement of a rod-shaped element (not shown) provided with an external thread. Some examples of a rod-shaped element are: a spark plug, a temperature sensor and a dummy rod.

The pressure-measuring plug 100 further comprises an circular membrane 105. The circular membrane 105 protects the diaphragm 104D from the combustion gasses in the cylinder of the combustion engine. A first rim of the circular membrane is welded to the plug body 102. A second rim of the circular membrane is welded to the inner section 104B of the sensing structure 104.

The pressure-measuring plug 100 functions as follows. The ring-shaped sensing structure 104 allows the inner section 104B to move relatively to the outer section 104A along the cylinder axis 104E of the ring-shaped sensing structure 104. The diaphragm 104D between the inner section 104B and outer section 104A allows a rod-shaped element inserted in the through hole 104C of the sensing structure 104 to move up and down in the pressure-measuring plug under the influence of pressure changes of the combustion gasses in the combustion chamber. The movement causes a strain in the diaphragm 104D that is the bridge between the inner section 104B and the rigid outer section 104A. The strain is measured by strain gauges (not shown) which are attached on the surface of the ring-shaped sensing structure facing away the threaded body part. The strain gauges which are piezo-resistive elements, translate the strain in the diaphragm into a resistance change. The resistance is translated into a voltage difference by means of a Wheatstone bridge. The voltage is corrected and amplified by an ASIC which is mounted on a printed circuit board 110.

In the sixth embodiment, the inner section 104B protrudes through the passage of the body tip section 106. A disc shaped body 111 is attached to the inner section 104B. In this embodiment, the disc shaped body 111 is attached to a distal end 104B1 of the inner section 104B. In another embodiment, the disc shaped body 111 is in the form of a cap which seals through hole 104C. The disc shaped body 111 is at a predetermined minimum distance from the outer surface of the body tip section 106. The predetermined minimum distance is at least the maximum movement of the inner section 104B along the axis 104E due to pressure changes in the combustion chamber.

The outer surface of the body tip section 106 comprises a raised edge 106D and a surface of the disc shaped body 111 facing the sealing body part 106 comprises another raised edge 111A resulting in a gooseneck-type passage from the combustion chamber to the plug chamber 107.

A platinum coating of >50 nm thickness on surface that are impacted by soot could be used to reduce soot deposits and adverse effects to cylinder pressure performance. The platinum is an active catalyst of soot to oxidize soot particles, i.e. unburned fuel condensates, long chain hydrocarbons, elemental carbon, etc. A platinum coating could be applied on the surface of the membrane 105 facing the body tip section 106 and the surfaces of the body tip section 106.

The purpose of the invention is to provide a cylinder pressure sensor that is less sensitive to soot exposure over the life time of the engine than current available pressure sensor structures. Soot can change the sensor characteristics and therefore an important durability and stability factor.

All the embodiments use the principle of direct-line-of sight prevention between the combustion chamber and the bending parts of the membrane 105, in combination with zero net flow which reduces soot accumulation at the parts of the membrane that bend when the pressure in the combustion chamber changes. The bending parts of the membrane correspond to the parts of the membrane positioned between the inner section and the outer section of the sensing structure.

In this way a soot particle filter is integrated in the pressure-measuring plug which reduces accumulation of soot particles on sensor critical elements, i.e. the bending or moving parts of the membrane.

It should be noted that instead of a soot particle filter integrated in tip of the pressure-measuring plug, a soot particle filter could be located in the bore between a pressure-measuring plug and the combustion chamber. This could be done by a stepped bore configuration.

The threaded body section 102A and body tip section 106 are preferably made of a high-resistance stainless steel, such as a precipitation hardening stainless steel with high strength and hardness, excellent corrosion resistance and easy heat treatment.

The sensing structure 104 could be manufactured by a Metal Injection Moulding MIM process. The strain gauges could be Microfused Silicon Strain Gauges made by a Micro Electro Mechanical System (MEMS) process and could be glass-bonded to the sensing structure 104. The membrane 105 is preferably made of an oxidation and corrosion resistant material well suited for service in extreme environments. Inconel alloys are examples of such a material.

While the invention has been described in terms of several embodiments, it is contemplated that alternatives, modifications, permutations and equivalents thereof will become apparent to those skilled in the art upon reading the specification and upon study of the drawings. It should be understood that although particular embodiments of the invention have been described by way of illustrating the invention, the invention includes all modifications and equivalents thereof falling within the scope of the appended claims.

The invention claimed is:

1. A pressure-measuring plug for a combustion engine comprising:
 a plug body comprising an external thread section for mounting the plug body into a cylinder head of the combustion engine and a body tip section facing in use the combustion chamber and comprising a passage;
 a ring-shaped sensing structure comprising an outer section, an inner section and an annular diaphragm, the plug body being attached to the outer section, wherein the ring-shaped sensing structure allows the inner section to move relatively to the outer section along a cylinder axis of the ring-shaped sensing structure by deformation of the diaphragm,
 a circular membrane comprising an outer part coupled to the outer section and an inner part coupled to the inner section, the membrane provides a sealing protecting the annular diaphragm against the harsh environment in a combustion chamber; and,
 a plug chamber formed by the circular membrane and the body tip section wherein the passage of the body tip section provides an open connection between the plug chamber and the combustion chamber, the pressure-measuring plug further comprising a channel structure forming the open connection between combustion chamber and the plug chamber, wherein the channel structure is configured to guide in use a gas flow from the combustion chamber to the plug chamber along a path, the path comprises a bend preventing direct line of sight between the combustion chamber and parts of the diaphragm positioned between the inner section and the outer section.

2. The pressure-measuring plug according to claim 1, wherein the path forces soot particles by their mass inertia to leave the gas flow and to hit at least one of a surface of body tip section and the inner section.

3. The pressure-measuring plug according to claim 2, wherein the inner section protrudes through the passage of the body tip section, the pressure-measuring plug further comprises a disc shaped body attached to the inner section and at a predetermined distance from the outer surface of the body tip section.

4. The pressure-measuring plug according to claim 3, wherein the outer surface of the body tip section comprises a raised edge and a surface of the disc shaped body facing the sealing body part comprises another raised edge resulting in a gooseneck-type passage.

5. The pressure-measuring plug according to claim 4, wherein the disc shaped body is attached to a distal end of the inner section.

6. The pressure-measuring plug according to claim 5, wherein the disc shaped body covers the distal end of the inner section.

7. The pressure-measuring plug according to claim 2, wherein the body tip section comprises at least one channel part with a channel axis which is at an angle with respect to the cylinder axis.

8. The pressure-measuring plug according to claim 2, wherein the body tip section comprises a central passage, a first part of the central passage which connects to the plug chamber has a conical shape.

9. The pressure-measuring plug according to claim 2, wherein the body tip section is configured to provide the channel structure wherein the gas flow passes subsequently a first passage and a second passage, the first passage and the second passage having a first passage axis and a second passage axis, respectively, the first passage axis being parallel to the second passage axis and wherein a cross section of the first passage and the second passage do not overlap.

10. The pressure-measuring plug according to claim 1, wherein the circular membrane covers a distal end of the inner section.

11. The pressure-measuring plug according to claim 10, wherein the body tip section comprises a sealing surface.

12. The pressure-measuring plug according to claim 10, wherein the body tip section comprises at least one channel part with a channel axis which is at an angle with respect to the cylinder axis.

13. The pressure-measuring plug according to claim 10, wherein the body tip section comprises a central passage, a first part of the central passage which connects to the plug chamber has a conical shape.

14. The pressure-measuring plug according to claim 1, wherein the body tip section comprises at least one channel part with a channel axis which is at an angle with respect to the cylinder axis.

15. The pressure-measuring plug according claim 14, wherein the channel axis of at the least one channel part is perpendicular to the cylinder axis.

16. The pressure-measuring plug according to claim 1, wherein the body tip section comprises a central passage, a first part of the central passage which connects to the plug chamber has a conical shape.

17. The pressure-measuring plug according to claim 16, wherein the central passage further comprise a middle part and a second part, the second part connects in use to the combustion chamber, the middle part having a first diameter and the second part having a second diameter, wherein the second diameter is larger than the first diameter.

18. The pressure-measuring plug according to claim 1, wherein the body tip section is configured to provide the channel structure wherein the gas flow passes subsequently a first passage and a second passage, the first passage and the second passage having a first passage axis and a second passage axis, respectively, the first passage axis being parallel to the second passage axis and wherein a cross section of the first passage and the second passage do not overlap.

19. The pressure-measuring plug according to 18, wherein the channel structure is formed by two parallel plate-like structures with passages, wherein the plate-like structures have a predefined mutual distance.

20. The pressure-measuring plug according to claim 1, wherein surfaces of the plug chamber and/or channel structure are covered with a platinum coating of >50 nm thickness.

* * * * *